Patented Feb. 19, 1946

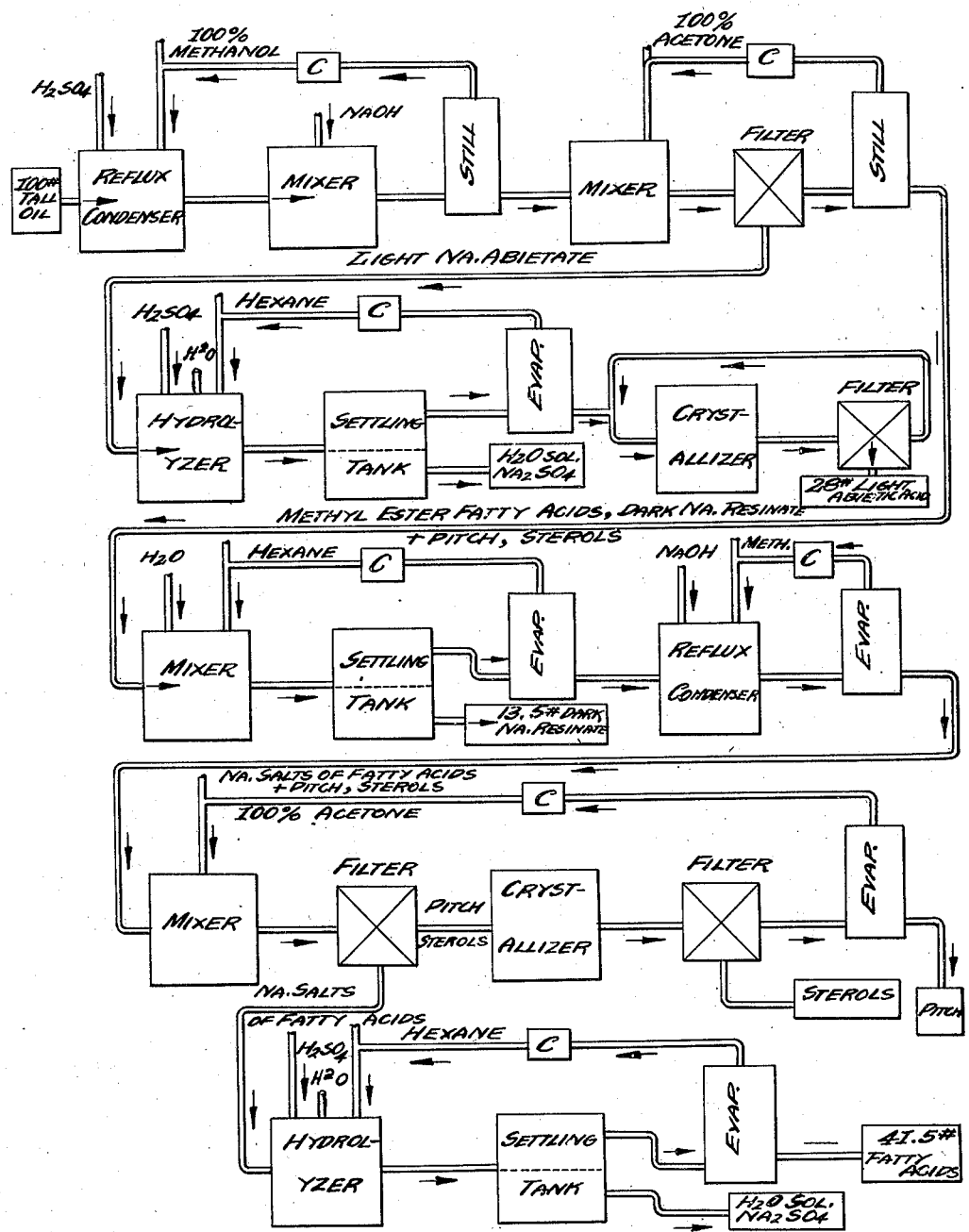

2,395,284

UNITED STATES PATENT OFFICE 2,395,284

PROCESS OF SEPARATING AND RECOVERING CONSTITUENTS OF WASTE LIQUOR FROM THE SODA AND SULPHATE PROCESSING OF CONIFEROUS WOODS

Joseph John Lovas, Ridgewood, and Paul F. Bruins, Douglaston, N. Y.

Application August 1, 1942, Serial No. 453,292

8 Claims. (Cl. 260—97.5)

This invention relates to a new and economical process of separating an organic mixture containing one or more types of rosin acids, fatty acids, sterols, and other unsaponifiable organic material, with particular reference to tall oil.

Tall oil is obtained as a by-product in the so-called sulphate process of manufacturing kraft paper. The tall oil is recovered from the waste liquors as the sodium salts of the fatty and rosin acids emulsified with unsaponifiable oil matter including sterols. When the spent black liquor obtained from the cooking of southern pine wood chips is concentrated, the emulsion floats to the surface as a dense foam or paste. Tall oil is recovered by skimming off and hydrolyzing the foam with mineral acid.

We have found that this crude tall oil is a mixture of more than one rosin acid, several types of fatty acids, sitosterols, higher alcohols and hydrocarbons. To be more specific, we have separated a sample of tall oil into the following constituents:

| | Per cent |
|---|---|
| Fatty acids | 45.00 |
| Crystalline abietic acid | 25.00 |
| Rosin acids (structure unknown) | 15.00 |
| Sitosterols | 1.35 |
| Higher alcohols and hydrocarbons | 10.00 |
| Unidentified residue | 3.65 |

The proportions of the constituents vary in different samples of tall oil due to its source or method of initial treatment.

In our process we employ the esterification principle in making a separation of the components of tall oil by esterifying with a monohydric alcohol in the presence of a catalyst. After esterification of the fatty acids, an organic solvent which when substantially anhydrous is completely miscible with a hydrocarbon, is added. This solvent must have the property of not being a solvent for either sodium abietate or the sodium salts of fatty acids, while it acts as a solvent for a certain mixture of sodium resinates (not of abietic acid structure), fatty acid esters and unsaponifiables, and which also has a preferential affinity for water. We also employ a hydrocarbon such as hexane.

Specifically we employ anhydrous methyl alcohol, anhydrous acetone, hexane, and water. It will be noted that they are all solvents of a relatively low boiling point and therefore subject to economical recovery. It will also be noted that these solvents are cheap and abundant. We do not wish to limit ourselves to these solvents, for in place of methyl alcohol we may use ethyl, propyl, butyl or any higher monohydric alcohol. For the ketone solvent, we may use methyl ethyl ketone, diethyl ketone, or any aliphatic ketone having an affinity for water. We may employ gasoline or kerosene and the like in place of hexane.

Generally, our process is as follows:

The crude soaps that are skimmed from the black liquor may be washed by dissolving in water and salting out with brine. The soap, purified, or as initially recovered, is then hydrolyzed by means of a mineral acid such as sulphuric acid. The crude tall oil is decanted and heated. After this heat treatment, it is esterified with methyl alcohol (anhydrous) using concentrated sulphuric acid as a catalyst. After esterification, the catalyst and the rosin acids are neutralized with the required amount of a 50% water solution of caustic soda.

The mixture is now heated and the free methyl alcohol and water distilled off. The residue is then treated with acetone, which dissolves a certain sodium resinate, the fatty acid esters, and the unsaponifiables. Only the major portion of the light sodium abietate remains undissolved. The said undissolved type, or light sodium abietate, is then removed, as by filtration and washed with acetone.

All the acetone washings are then combined with the filtrate and then a low boiling hydrocarbon solvent, such as hexane, is added to the whole solution and thoroughly mixed. Water is added to this solution until two layers form. Since the acetone and the remaining sodium resinate are more soluble in water, they will readily separate, as a lower layer, from the hydrocarbon solution of the fatty acid esters, pitch and unsaponifiables. The two layers are then separated by decantation and the acetone-water layer is heated to distill off the acetone, leaving a water solution of the second type or dark sodium resinate.

The hydrocarbon solution of fatty acid esters, pitch and unsaponifiables is now heated to distill off the hexane. The residue is then dissolved in anhydrous methyl alcohol and solid caustic soda flakes are added in large enough proportions to completely saponify the fatty acid esters. This mixture is heated for about two hours and then the alcohol is distilled off. The residue is again treated with anhydrous acetone which dissolves only the pitch and unsaponifiables (sterols included).

The residue of sodium salts of fatty acids is then removed, as by filtration, and washed with clean acetone. The washed sodium salts of fatty acids are now dried in an enclosed container and the acetone vapors recovered, or they may be dissolved in water, the ketone stripped therefrom, and hydrolyzed to recover the fatty acids.

The filtrate and washings are then heated and the acetone distilled off until the residue in the still consists of approximately 1 part unsaponifiables and 1 part acetone. This solution is chilled to crystallize the sterols from the solution.

The sterol crystals are then removed, as by filtration, and the filtrate is heated to distill off the remaining acetone. The residue consists of pitch and possibly some higher alcohols and hydrocarbons.

The light sodium abietate obtained from the first separation may now be hydrolyzed and the liberated light abietic acid purified by crystallization from a hydrocarbon. We have found that if the light sodium abietate obtained from the first separation is re-crystallized from anhydrous methyl alcohol, pure white crystals of sodium abietate can be obtained. If the purified sodium abietate is then hydrolyzed with a mineral acid, and the product is crystallized from a hydrocarbon, pure white crystalline abietic acid is obtained.

The dark sodium resinate obtained from the second separation may be separated from the water by evaporation or salted out of the water solution and dried as sodium resinate, or it may be hydrolyzed and a dark brown rosin acid obtained. The sodium salts of the fatty acids may be hydrolyzed and a substantially rosin-free fatty acid may be obtained, the color of which is lighter than commercial crude oleic acid.

The sterols may be purified by recrystallization, whereupon pure white crystals are obtained.

The residual pitch and possibly some higher alcohols and hydrocarbons are of a color similar to the fatty acids obtained.

Although neutralization of the sulphuric acid and the rosin acids may be effected with a water solution of caustic soda, we prefer to employ an alcohol solvent for the caustic soda to enable more ready removal of the solvent preparatory to use of the ketone.

In the operation of our process the starting material may be first freed of pitch and sterols and any oxidized rosin, so that such starting material may be termed "mixed acids," i. e., a mixture containing chiefly the water insoluble fatty acids and light and dark rosin acids, found in tall oil.

These "mixed acids" are esterified by anhydrous methanol in the presence of an esterifying catalyst such as sulphuric acid, as indicated in the annexed drawing which relates primarily to the treatment of tall oil. In fact, the procedure is identical with that employed in the treatment of tall oil with the exception that a number of the later steps are omitted. By such esterification the fatty acids are converted to certain alcohol esters, but the two types of rosin acids remain unreacted.

The mixture of alcohol esters and rosin acids is subjected to the action of caustic soda followed by stripping off methanol. An anhydrous ketone such as acetone then is added, whereby the light sodium abietate is precipitated and may be removed, as by filtration.

The resulting solution contains fatty acid esters and dark sodium resinate. The acetone is stripped from the solution and the latter is run to a mixing tank wherein hexane and water are added. The resulting mixture is settled to form two layers, an upper layer consisting of hexane solution of fatty acid esters and the lower layer consisting of a water solution of dark sodium resinate. These layers are separated, the hexane stripped from the layer of fatty acid esters for recovery of the latter, and water evaporated from the dark sodium resinate.

The dark sodium resinate if desired, may be hydrolyzed for the recovery of dark rosin acid.

If desired, the fatty acid esters may be saponified to produce fatty acid sodium salts and these in turn may be hydrolyzed for the production and recovery of substantially pure fatty acids.

As examples—

*Example I*

Tall oil with the following analysis was used as a raw material for this experiment:

Acid No.=159
Rosin No.=73
Saponification No.=166
Fatty acid=43.15%
Rosin acid=39.25%
Unsaponifiable=18.00%

202 parts by weight of tall oil was added to 160 parts by weight of anhydrous methanol and 27 parts by weight of methyl sulphuric acid. The mixture was refluxed for four hours. At the end of the reflux period, 13.5 parts by weight of caustic soda was added to saponify the rosin acids and neutralize the sulphuric acid catalyst.

The free methanol was then distilled out of the mixture. The residue was treated with two portions each of 500 parts by weight of 99.9% acetone and filtered. The filter cake was dried and hydrolyzed with mineral acid and 50 parts by weight of abietic acid were recovered. The filtrate was added to 750 parts by weight of hexane, with a boiling range of 60-70° C. 500 parts by weight of water were then added; the mixture was slowly agitated and allowed to stand. In about 20 minutes, two layers were formed, the lower layer containing acetone, water, and the sodium salts of rosin acids along with a small amount of fatty esters. The upper layer consisted of hexane, fatty esters, pitch, and unsaponifiables.

The lower layer was distilled to recover the acetone. The residual solution of water and sodium resinate was then hydrolyzed and another portion of dark rosin acids was recovered amounting to 35 parts by weight.

The upper layer was now distilled to recover the hexane. The residue was saponified by heating for two hours with alcoholic solution of caustic soda (15 parts by weight of caustic soda in 160 parts by weight of methanol). The alcoholic solution of sodium salts of fatty acid was then distilled to recover the alcohol. The residue was treated with two portions, each of 400 parts by weight of acetone and filtered after each acetone treatment. The filter cake of sodium salts of fatty acids was then dissolved in water, heated to recover the acetone, and then hydrolyzed with a small excess of mineral acid. Hexane was added to pick up the fatty acids, the mixture being settled to form two layers, the top layer being a hexane solution of fatty acids, which was separated and stripped of solvent. The fatty acid recovered did not show a trace of rosin acid by the Lieberman-Storch test, and was found to amount to 78 parts by weight.

The filtrate after removal of the undissolved sodium salts of fatty acids was now distilled to recover the acetone. 38 parts by weight of unsaponifiables, pitch and sterols, and possibly other unsaponifiables, were recovered in the residue. The sterols may first be separated from the acetone solution by chilling the same to crystallize the sterols, the crystals being removed, as by filtration, their recovery being 4.5 parts by weight. The pitch recovery, including any other unsaponifiables, was 33.5 parts by weight.

*Example II*

200 parts by weight of crude tall oil testing:

| | Per cent |
|---|---|
| Rosin acids (as abietic acids) | 44.7 |
| Fatty acids | 47.2 |
| Unsaponifiables | 8.1 | and approximately two years old was added to 80 parts by weight of anhydrous methanol and 6 parts by weight of concentrated sulphuric acid.

The procedure in this example was identical with that employed in Example I.

The first rosin acid fraction recovered amounting to 50 parts by weight was dissolved in 150 parts by weight of hexane and allowed to cool and crystallize. The rosin acid crystals obtained had a melting point of 192° C. and an apparent molecular weight of 406 as determined from the acid number. The second fraction of rosin acid recovered amounted to 36 parts by weight, giving a total of 86 parts by weight of rosin acid recovered. The fatty esters recovered weighed 116 parts by weight of rosin acid recovered. The fatty esters recovered weighed 116 parts by weight, which upon saponification, yielded 94 parts by weight of fatty acids. The fatty acid had a color resembling crude commercial oleic acid. A total of 20 parts by weight of unsaponifiables were also recovered.

Our method overcomes great difficulties found with other methods which have heretofore attempted the separation of fatty acids and rosin acids from tall oil and employing the principle of esterifying the fatty acids without esterification of the rosin acids. For example, it has been heretofore proposed (United States Patent No. 1,736,802) to effect separation by esterifying the fatty acids of the mixture with "alcohol" (which would logically be considered ethyl alcohol), using sulphuric acid as the catalyst, and after esterification neutralizing the free rosin and mineral acids with a water solution of caustic soda. The resulting mixture of sodium resinates and esterified fatty acids was treated with a hydrocarbon and water in an attempt to dissolve the esterified fatty acids and unsaponifiables and wash out the sodium resinates with water. Such a method, however, forms a layer containing the esterified fatty acids in stubborn emulsion with the water solution of sodium resinates. This emulsion is so stubborn that it is commercially impossible to obtain good separation.

A second proposed method, based on the selective esterification principle (United States Patent No. 2,166,812) is similar to that just described but employs furfural in conjunction with a hydrocarbon in an attempt to separate the fatty acid esters and sodium resinates. The resulting mixture is stirred and water is added to separate the mixture into two layers. The lower layer consists of sodium resinate, furfural and water, while the upper layer consists of a hydrocarbon solution of fatty acid esters and some unsaponifiables. In the subsequent treatment of these layers stubborn emulsions are formed, and, furthermore, the complete recovery of furfural is very difficult due to the ease of polymerization. Also no separation of the different types of rosin acids is accomplished, since in the said process they are removed as a mixture. The fatty acid recovered by this said process was rather dark and of poor quality. All of these difficulties are avoided by our process.

It will be understood that while we prefer the use of sodium hydroxide as the saponifying agent for the rosin acids, other saponifying agents recognized as equivalents may be substituted.

Having described our invention, what we claim and desire to secure by Letters Patent is as follows:

1. In a process of separating and recovering constituents of tall oil and other mixtures containing chiefly water-insoluble fatty acids, rosin acids, sterols and pitch, which comprises selectively esterifying the fatty acids only with a monohydric alcohol in the presence of an esterifying catalyst, saponifying the rosin acids with sodium hydroxide and stripping off the excess alcohol, the step of adding a substantially anhydrous aliphatic ketone selected from the group consisting of acetone, methylethyl ketone and diethyl ketone to the mixture of esterified and saponified constituents, whereby the constituents are dissolved with the exception of light sodium abietate, and removing the light sodium abietate.

2. In a process of separating and recovering constituents of tall oil and other mixtures containing chiefly water-insoluble fatty acids, rosin acids, sterols and pitch, which comprises selectively esterifying the fatty acids only with a monohydric alcohol in the presence of an esterifying catalyst, saponifying the rosin acids with sodium hydroxide and stripping off the excess alcohol, the steps of adding a substantially anhydrous aliphatic ketone selected from the group consisting of acetone, methylethyl ketone and diethyl ketone to the mixture of esterified and saponified constituents, whereby the constituents are dissolved with the exception of light sodium abietate, removing the light sodium abietate, stripping ketone from the remaining solution, adding water and a lower boiling hydrocarbon selected from the group consisting of hexane, gasoline, and kerosene and settling to form two layers, the upper layer being a hydrocarbon solution of fatty acid esters, pitch and sterols, and the lower layer being dark sodium resinate in water solution, separating the layers and evaporating water from the water layer for the recovery of dark sodium resinate.

3. In a process of separating and recovering constituents of tall oil and other mixtures containing chiefly water-insoluble fatty acids, rosin acids, sterols and pitch, which comprises selectively esterifying the fatty acids only with a monohydric alcohol in the presence of an esterifying catalyst, saponifying the rosin acids with sodium hydroxide and stripping off the excess alcohol, the steps of adding a substantially anhydrous aliphatic ketone selected from the group consisting of acetone, methylethyl ketone and diethyl ketone to the mixture of esterified and saponified constituents, whereby the constituents are dissolved with the exception of light sodium abietate, removing the light sodium abietate, stripping ketone from the remaining solution, adding water and a lower boiling hydrocarbon selected from the group consisting of hexane, gasoline, and kerosene to form two layers, the upper layer being a hydrocarbon solution of fatty acid esters, pitch and sterols, and the lower layer being dark sodium resinate in water solution, separating the layers, evaporating the hydrocarbon from the upper layer, saponifying said layer with sodium hydroxide in the presence of a monohydric alcohol similar to that initially employed, stripping off the alcohol, mixing the resulting salts of fatty acids, pitch and sterols with anhydrous aliphatic ketone to precipitate the sodium salts of fatty acids, and removing the said sodium salts.

4. In a process of separating and recovering constituents of tall oil and other mixtures containing chiefly water-insoluble fatty acids, rosin acids, sterols and pitch, which comprises selectively esterifying the fatty acids only with a monohydric alcohol in the presence of an esterifying catalyst, saponifying the rosin acids with sodium hydroxide and stripping off the excess alcohol, the steps of adding a substantially anhydrous aliphatic ketone selected from the group consisting of acetone, methylethyl ketone and diethyl ketone to the mixture of esterified and saponified constituents, whereby the constituents are dissolved with the exception of light sodium abietate, removing the light sodium abietate, stripping ketone from the remaining solution, adding water and a lower boiling hydrocarbon selected from the group consisting of hexane, gasoline, and kerosene to form two layers, the upper layer being a hydrocarbon solution of fatty acid esters, pitch and sterols, and the lower layer being dark sodium resinate in water solution, separating the layers, evaporating the hydrocarbon from the upper layer, saponifying said layer with sodium hydroxide in the presence of a monohydric alcohol similar to that initially employed, stripping off the alcohol, mixing the resulting sodium salts of fatty acids, pitch and sterols with anhydrous aliphatic ketone to precipitate the sodium salts of fatty acids, removing the said sodium salts, subjecting the ketone solution of pitch and sterols to chilling and crystallization of the sterols, removing the crystalline sterols, and evaporating the ketone to recover the pitch.

5. A process in accordance with claim 1, in which the ketone is substantially anhydrous acetone.

6. A process of separating and recovering constituents of tall oil consisting of mixtures of water-insoluble fatty acids and rosin acids, which comprises adding to said mixture a monohydric alcohol in the presence of an esterifying catalyst and thereby selectively esterifying the fatty acids only, adding sodium hydroxide and thereby saponifying the rosin acids, stripping off the excess alcohol, subjecting the mixture to the solvent action of a substantially anhydrous aliphatic ketone selected from the group consisting of acetone, methylethyl ketone and diethyl ketone, whereby the light sodium abietate remains undissolved, removing the light sodium abietate, stripping the ketone from the remaining solution, then adding water and a low boiling hydrocarbon selected from the group consisting of hexane, gasoline, and kerosene to the mixture and settling to form two layers, the upper layer consisting of a hydrocarbon solution of monohydric fatty acid esters, and the lower layer consisting of sodium resinate in water solution, separating the layers, and evaporating the hydrocarbon from said upper layer to recover the fatty acid esters.

7. A process of separating and recovering constituents of tall oil consisting of mixture of water-insoluble fatty acids and rosin acids, which comprises adding to said mixture a monohydric alcohol in the presence of an esterifying catalyst and thereby selectively esterifying the fatty acids only, adding sodium hydroxide and thereby saponifying the rosin acids, stripping off the excess alcohol, subjecting the mixture to the solvent action of a substantially anhydrous aliphatic ketone selected from the group consisting of acetone, methylethyl ketone and diethyl ketone, whereby the light sodium abietate remains undissolved, removing the light sodium abietate, stripping the ketone from the remaining solution, then adding water and a low boiling hydrocarbon selected from the group consisting of hexane, gasoline, and kerosene to the mixture and settling to form two layers, the upper layer consisting of a hydrocarbon solution of monohydric fatty acid esters, and the lower layer consisting of sodium resinate in water solution, separating the layers, evaporating the hydrocarbon from the upper layer, saponifying the last named layer with sodium hydroxide in the presence of a monohydric alcohol similar to that initially employed, evaporating the alcohol, mixing the residue with substantially anhydrous aliphatic ketone whereby the sodium salts of fatty acids are precipitated, and removing the said precipitated sodium salts of fatty acids.

8. A process in accordance with claim 1, in which the light sodium abietate is mixed with hot anhydrous methyl alcohol followed by chilling the solution, thereby crystallizing pure white crystals of sodium abietate.

JOSEPH JOHN LOVAS.
PAUL F. BRUINS.